March 25, 1952 G. D. HANCHETT, JR 2,590,310
SELECTIVE SQUELCH CIRCUIT
Filed Aug. 20, 1947
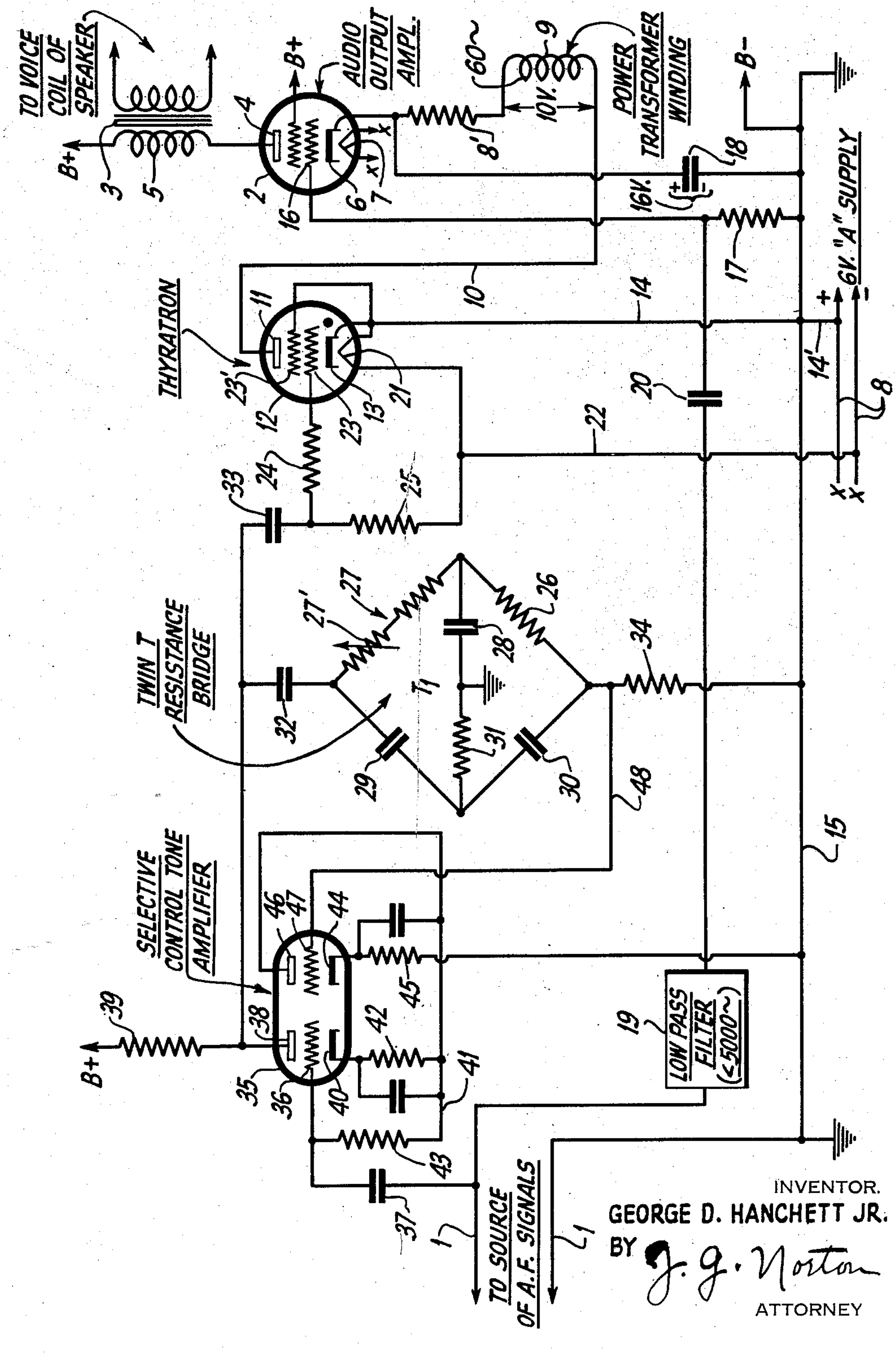
INVENTOR.
GEORGE D. HANCHETT JR.
BY J. G. Norton
ATTORNEY Patented Mar. 25, 1952

2,590,310

UNITED STATES PATENT OFFICE 2,590,310

SELECTIVE SQUELCH CIRCUIT

George D. Hanchett, Jr., Millburn, N. J., assignor to Radio Corporation of America, a corporation of Delaware Application August 20, 1947, Serial No. 769,600

10 Claims. (Cl. 179—171)

My present invention relates generally to electronic selective squelch circuits, and more particularly to an improved squelch circuit adapted to be selectively responsive to a predetermined tone signal.

In mobile communication work, such as used for example by municipal police and fire departments, it is desirable to have some method by which a particular receiver, or a group of receivers, in the mobile units can be selected for radio communication. In the past such selective communication has been provided by relatively complicated circuits both at the transmitter and at the desired receivers.

It is an important object of my present invention to provide a selective radio communication system which utilizes at the desired receiving point an electronic selective squelch circuit employing a thyratron squelch tube.

In accordance with another object of my invention there is provided an audio frequency amplifier whose output tube has its plate current consumption controlled by an electronic switch device thereby to provide a substantial economy in the total receiver "B" supply current.

It is another object of my invention to provide in combination with a source of audio frequency energy, which energy includes a tone signal of a frequency above the highest usable audio signal frequency, an audio frequency amplifier network adapted to be controlled in its operation by an electronic switch device having its own operation dependent upon a selective controlled system which is responsive to the aforesaid tone, whereby the audio amplifier will not require any "B" supply power during such periods of time when audio frequency energy is not supplied to it.

From a more specific viewpoint, in accordance with my present invention, if a dispatcher at a fixed or main station desires to contact a particular mobile unit, he will select a frequency for tone modulation that will be above the normal voice communication frequencies, and to which the particular desired mobile receiver is tuned. This tone after detection in the receiver is passed to a resistance tuned amplifier, and then on to a thyratron squelch circuit. The advantage of the thyratron squelch circuit is that it is a definite on-off device. Even if the tone signal is reduced in intensity due to a changing field strength the receiver will not "shoot off" or reduce in gain value.

One added advantage of the present system is the fact that the squelch is effective on the output amplifier. This is a power saving scheme, since the output amplifier requires a large proportion of the total receiver "B" supply current. Stand-by periods then will not require any "B" supply power to the output amplifier. The thyratron squelch tube employs a selective input circuit which is made up of a pair of triodes whose space current paths are arranged in series, there being included a degenerative feedback path between the plate circuit of one triode and the grid circuit of its associated triode. The feed back path includes a resistance-capacity bridge circuit having a characteristic which shows a sharp rejection dip at a predetermined frequency.

Still other features and objects of my invention will best be understood by reference to the following description taken in connection with the drawing, in which I have indicated diagrammatically a circuit organization whereby my invention may be carried into effect.

Referring now to the accompanying drawing, which shows a circuit embodying my present invention, the numeral 1 designates the conductors leading to any desired source of audio frequency signals. As stated heretofore, the source of audio frequency signals may be the detector of a mobile receiver with which a fixed transmitter is seeking radio communication. On the other hand the source of audio frequency signals may be a line transmitting the audio energy, or it may even be a public address system, such as used in a hospital, school, hotel, railroad station and the like, where it is desired to provide selective announcements over various loudspeakers at certain times, where as at other times it is desired to have the loudspeakers silent.

Assuming for the purposes of this application that the tube 2 is the audio output amplifier tube of a mobile receiver, it is pointed out that in such case the transmitter, whether it be mobile or fixed, will modulate its carrier with the normal voice frequencies, but will include on the carrier a specific tone signal. For example, if there are a dozen police radio patrol cars in a given area which are in communication with a transmitter, each receiver will have a specifically different tone frequency assigned to it. Since the band from 30 cycles to 5000 cycles covers the normal voice communication, then each of the mobile receivers will employ a respective tone frequency of from 6000 cycles to 18,000 cycles. If at the main station it is desired to contact a particular mobile unit, say 6000 cycles, at the transmitter there will be applied to the carrier to which all the mobile receivers are tuned the normal voice communication frequencies in the band up to 5000 cycles, but, in addition, there will be a 6000 tone modulation applied to the carrier. On the other hand, if it is desired to transmit a general call to all mobile receivers, then all the tone signals from 6000 to 18,000 cycles will be applied to the carrier with the voice modulation frequencies. At each receiver I have provided means for having the audio amplifier system rendered operative solely in response to the emission from the main station of its carrier modulated with the tone frequency of the particular mobile receiver. In this way by proper selection and tuning of the receivers it is possible to secure single station to station communication.

It will obviously be understood that unless the audio frequency signals applied to the conductors 1 include a predetermined tone modulation frequency, regardless of the source of the audio signals, the output amplifier tube 2 will not become operative. In the case of the amplifier being included in a mobile receiver as explained above, the received modulated carrier will, of course, be selective by proper tuning and amplification, and after detection to secure all the modulation signals on the carrier, the modulation voltage is applied to conductors 1. In the case of a public address system the output of the microphone of the system will include a super-audible tone frequency, say above 6000 cycles, for controlling the operation of amplifier 2 while the audio signals are applied to conductors 1.

The circuits involved in the system are shown in the drawing between the conductors 1 and the amplifier tube 2. Numeral 3 designates the audio frequency output transformer coupling the plate 4 of tube 2 to the voice coil of a suitable loudspeaker (not shown). The primary winding 5 of transformer 3 is included in circuit with plate 4 and the B+ terminal of the power supply network (not shown). The cathode 6 is of the indirectly heated type, and it is to be understood that its heating filament 7 will be connected, as indicated by letters *xx*, to the "A" supply lines 8. The "A" supply line may be the usual 6 volts rated supply circuit, and in the case of a mobile receiver unit will be a suitable portion of the generator system of the car. The B+ terminal, of course, will be located at a suitable point on the rectified output of the generator supply circuit. Those skilled in the art of radio communication are well acquainted with the circuits used to energize radio receiving systems, and it is not believed necessary to illustrate in further details the "A" and "B" supply circuits for the amplifier system.

The cathode 6 is connected to ground, which is shown as the B− terminal of the power supply system, through a series path which includes resistor 8′, winding 9, lead 10, plate 11 of thyratron tube 12, cathode 13 of the thyratron tube and lead 14. The grounded line of the system is indicated by the numeral 15. It will, therefore, be seen that the space current path of thyratron tube 12 completes the space current circuit of amplifier tube 2. It is obvious that when there is no conduction between the cathode and plate of thyratron tube 12, then the output amplifier tube 2 is cut off, and vice versa. The winding 9 is another of the windings on one of the power transformers of the power supply system. Hence, there exists across winding 9 alternating current voltage, say about 10 volts peak. For example, the alternating current voltage across winding 9 may be the domestic 60 cycles, which means that the plate 11 of thyratron tube 12 will have applied thereto the alternating current voltage existing across winding 9. In this way the tube 12 is under the control of the periodic voltage variations at winding 9. The frequency of the voltage across winding 9 will be 100 cycles where the voltage is derived from the natural period of the vibrator when used in mobile work.

The signal input grid 16 of tube 2 is connected to ground through the resistor 17. The cathode end of resistor 8 is connected to ground through condenser 18 whose upper electrode is indicated as having a positive potential. It is, also, indicated that substantially 16 volts are developed across condenser 18 as a negative bias for the grid 16. Condenser 18 is the cathode bypass condenser. The grid 16 is coupled to the source of audio frequency signals 1 through a path which includes a low pass filter 19 and audio frequency coupling condenser 20. Briefly, the low pass filter passes all audio frequencies between zero to 5000 cycles, which means that all tone frequencies above 5000 cycles will be rejected. Since the voice communication frequencies are all in the audio range between 30 cycles and frequencies considerably less than 5000 cycles, it follows that there will not be applied to signal grid 16 any of the control tone components.

Considering now, the thyratron control tube 12 and its selective input circuit, the thyratron tube is, of course, a gas tube as indicated schematically by the black dot adjacent cathode 13. The heating filament 21 has one of its leads 22 connected to one side of the "A" supply, while the second lead of filament 21 is connected through conductors 14 and 14′ to the opposite side of the "A" supply circuit. Since the cathode 13 is connected to one side of the "A" supply circuit, the control grid 23 of tube 12 may be connected to the lead 22 to establish a predetermined negative bias for thyratron grid 23. This is done by connecting grid 23 to the conductor 22 through the path comprising resistor 24 and resistor 25 in series. It will be understood, therefore, that grid 23 has a normal −6 volts bias with respect to cathode 13.

The selective input circuit of the thyratron tube 12 generally consists of a degenerative system which functions to invert the impedance characteristic provided by the resistance-capacitor bridge $T_1$. The bridge $T_1$ is a twin T resistance bridge which normally possesses a sharp frequency rejection characteristic at the predetermined tone frequency to which it is desired that the audio amplifier be operative. For example, if the tone frequency in the given example were 6000 cycles, then the bridge $T_1$ normally has sharp rejection dip at 6000 cycles. This type of resistance bridge circuit is known by itself.

One of the T sections of the bridge consists of resistor arms 26 and 27 and the condenser 28, having its ungrounded electrode connected to the junction of resistor arms 26 and 27. The second T section of the bridge consists of a condenser arm 29, a condenser arm 30 and a resistor 31 whose ungrounded end is connected to the junction of condenser arms 29 and 30. I prefer to divide resistor arm 27 in two sections, and section 27′ is made adjustable so as to vary the frequency response of the bridge $T_1$.

The junction of arms 27 and 29 is connected through a coupling condenser 32 to the input electrode of the direct current blocking condenser 33 whose output electrode is connected to the junction of resistors 24 and 25. The junction of arms 26 and 30 is connected through resistor 34 to the ground line 15.

The bridge $T_1$ is itself connected in a degenerative feed-back path between a pair of triodes whose space current paths are arranged in a series connection. Thus, I have shown the pair of triodes as included in a common twin triode tube 35, although separate tubes may be utilized. In addition, I am not restricted to the use of triodes, since any other suitable type of tube may be employed. The input triode has its input grid 36 connected through the audio coupling condenser 37 to the ungrounded conductor 1 of the audio frequency signal source. In other words, there is applied to the control grid 36 the entire audio voltage, both voice modulation frequencies and control tone, existing at the audio source. The plate 38 of the input triode is connected to the B+ terminal through a suitable resistor 39, while the cathode 40 is connected to lead 41 through a suitable bypassed bias resistor 42.

The control grid 36 is connected through resistor 43 to the low potential end of bias resistor 42 whereby the input triode functions as an audio amplifier. The series triode of tube 35 has its cathode 44 connected to the grounded line 15 through a suitably bypassed bias resistor 45, while the plate 46 is connected to the low potential end of bias resistor 42. In other words, the space current of the input triode of tube 35 flows through the second triode between plate 46 and cathode 44 to ground. The control grid 47 is connected to the high potential end of resistor 34 through lead 48. It will, therefore, be seen that a normal negative bias is applied to grid 47 which is equal to the voltage developed across bias resistor 45. In addition, there is applied to grid 47 in degenerative phase voltage developed across the bridge $T_1$.

The voltage developed across bridge $T_1$ is, of course, an increasing quantity on either side of the illustrative 6000 cycle frequency by virtue of the rejection characteristic of the bridge. The degenerative circuit is 100% degenerative for all frequencies except the null (6000 cycle) frequency of the bridge. Accordingly, there will be applied from the plate circuit of the input triode only voltage which has the null frequency, which is the desired 6000 cycle control tone frequency. It is pointed out that by means of the degenerative feedback across the bridge $T_1$ to the series triode 44, 47, 46 there has been provided an inversion of the impedance characteristic of the bridge. That is to say, the resultant effect of the feedback arrangement of the series triode is to provide the thyratron input electrode with a selective input circuit which has a very sharp peak at the control tone frequency.

Considering, now, the operation of the thyratron circuit, and more particularly its function as an electronic switch in the cathode circuit of the output amplifier tube 2, it is first pointed out that tube 12 is normally non-conductive by virtue of the normal −6 volts bias applied to grid 23. It is not believed necessary to describe in detail the functioning of a gas tube of the thyratron type. The grid 23′, which is tied to the cathode 13, is utilized to secure the normal sharp "on-off" characteristic of the thyratron. Actually, the tube functions in the manner of a grid-controlled rectifier of alternating current voltage. In this case the alternating voltage at 60 cycles is applied to the plate 11.

Upon the application of the control tone voltage through condenser 33 to grid 23 the gas tube "fires" and becomes conductive. As long as the tone voltage is applied to grid 23 the thyratron tube remains in conductive condition despite the application of the alternating voltage to the plate 11. However, should the control tone voltage be removed from grid 23, then the tube 12 will immediately become non-conductive. This is due to the fact that the plate 11 is rendered inactive on the negative half cycles of the alternating current voltage existing at winding 9. If a tone signal is applied to grid 23 the thyratron tube 12 will conduct on each positive half cycle of the voltage from winding 9, and will extinguish on each negative half cycle. The current, therefore, appearing through condenser 18 will be periodic, but the value of capacity of condenser 18 is sufficient to smooth the voltage to a point where the grid bias of tube 2 is substantially steady.

It will, therefore, be seen that the function of coil or winding 9 is periodically to sense, or seek, to determine whether a tone voltage is applied to grid 23 of the thyratron tube. If the tone voltage does exist at grid 23, then during the positive half cycles of the voltage of plate 11 the tube remains conductive. The removal of the tone voltage results in the thyratron being rendered non-conductive, as explained before. It will, now, be seen that the resistance 8, winding 9, capacitance 18 and the thyratron tube 12 provide the cathode biasing circuit of the output amplifier tube.

When the thyratron is conducting it will have a definite potential drop from its anode 11 to cathode 13 of approximately 8 volts in most cases. The resistance 8′ is used in series with this potential drop to produce the proper operating bias for the output tube. The function of the winding 9 is periodically to throw the plate 11 below the sustaining ionization potential. Hence, if the signal from the main transmitter has ceased, then the next cycle that the anode 11 of the thyratron is driven negative will de-ionize the thyratron tube and its grid will again gain control of the tube.

One of the main advantages of this system is that the thyratron squelch tube will not be actuated, or rendered conductive, unless there is applied to the conductors 1 a desired tone frequency. In other words if the bridge $T_1$ is adjusted for a desired tone frequency, say 6000 cycles, then a tone of 6500 or 7000 cycles will not open the squelch tube 12. Of course, if the transmitter carrier has all tone frequencies thereon, then all squelch tubes at the various receivers will become conductive.

Another important advantage of this system is the fact that the squelch tube operates at the cathode of the output amplifier tube. This is a power saving arrangement, since the output amplifier tube requires a large proportion of the total receiver "B" supply current. Stand-by periods will not require any "B" supply power to the output amplifier tube. In this way it is possible to eliminate the usual driver tube and class B stage usually employed in amplitude modulated receivers of the mobile type. All that is necessary in the operation of the present system is that the relatively small "A" supply current be expended to heat the filaments of tubes 12 and 2.

It is pointed out that by cutting out the plate current consumption of the output tube 2 during stand-by periods, as much as ⅓ to ½ of the "B" supply power is economized. In this way there is secured economy of power consumption, the relatively expensive circuits required for a class B output stage is eliminated, and the output tube 2 may be operated as a class A audio amplifier. This system may be used with either frequency or amplitude modulated receivers.

While I have indicated and described a system for carrying my invention into effect, it will be apparent to one skilled in the art that my invention is by no means limited to the particular organization shown and described, but that many modifications may be made without departing from the scope of my invention.

What I claim is:

1. In combination with a source of audio frequency signals to be amplified in which a control tone signal of a predetermined high audio frequency may be selectively introduced, an amplifier tube for said signals to be amplified having input and output electrodes, filter means between said source and said input electrodes effective to apply only the signals to be amplified to said input electrodes, said output electrodes being adapted for connection to an audio utilization circuit, a direct current voltage supply circuit including the space current path of said tube, an electronic control device included serially in circuit with said space current path of said tube, and a second filter means responsive to said control tone frequency connected between said source and said electronic control device and effective to apply only control tone frequency signal currents to said electronic discharge device, whereby said electronic discharge device is rendered operable only when said control tone signal is introduced in said source to effect operation of said amplifier tube and consequent amplifiction thereby of the signals to be amplified.

2. In a system as defined in claim 1, said electronic device being a thyratron gas tube, said gas tube having its space current path arranged in series with the space current path of said audio amplifier tube.

3. In a system as defined in claim 2, a source of alternating current voltage in circuit with the space current paths of said thyratron gas tube and said audio amplifier tube.

4. In an audio amplifier for audio frequency signals, a direct current voltage energizing circuit connected to said amplifier, a thyratron gas tube connected in series in the cathode circuit of said amplifier and functioning as a stand-by switch to economize energizing current, a selective resistance-capacity input circuit for said thyratron tube, tuned to a frequency which is equal to the frequency of a control tone signal included in said audio signals effecting operation of said thyratron tube and said audio amplifier only upon inclusion of said control tone signal in said audio frequency signals.

5. In an electronic tube amplifier, the combination with an amplifier stage thereof having a cathode return circuit, of a grid-controlled gas tube having input electrodes and output electrodes connected with said cathode return circuit to control the current therethrough, means for periodically energizing the output electrode of the gas tube with alternating current voltage, a highly selective input circuit for the input electrodes of the gas tube, said input circuit comprising a pair of electron discharge tubes having their space current paths arranged in series, means for applying a control signal voltage to the input electrode of one of the series connected tubes, an impedance network having a predetermined frequency rejection characteristic arranged in the output circuit of said one tube, said impedance network being included between the input electrodes of said gas tube, a degenerative feedback circuit connected from said impedance network to the control grid of the second of said series connected tubes, a source of signals to be amplified in which a control signal may be selectively included, filter means effective to permit only the signals to be amplified to be applied to said amplifier stage, and said impedance network being effective to permit only said control signal voltage to be applied to the input electrodes of said gas tube, whereby said gas tube is rendered conductive and said amplifier stage is rendered operable to amplify the signals to be amplified upon the application of said control signal voltage to the input electrodes of said gas tube.

6. In combination with a source of signals to be amplified which include a control signal of a predetermined higher frequency, an amplifier tube having input and output electrodes, said source being coupled to the input electrodes, means coupling said source and said input electrodes effecting the application of the signals to be amplified to said input electrodes, said output electrodes being adapted for connection to a signal utilization circuit, a voltage supply circuit including the space current path of said tube, an electronic control device included serially in circuit with said space current path of said tube, a frequency selective network responsive to said control signal frequency for controlling the effect of said electronic control device, coupling means effecting the application of control signal currents with the signal currents to be amplified to said frequency selective network, and said frequency selective network being effective to permit only the control signal voltage to be applied to said electronic discharge device.

7. In a system as defined in claim 6, said electronic device being a thyratron gas tube, said gas tube having its space current path arranged in series with the space current path of said amplifier tube.

8. In an electronic tube signal amplifier, the combination with a signal amplifying stage thereof having a cathode return circuit, of a grid-controlled gas tube having input electrodes and output electrodes connected serially with said cathode return circuit, means for energizing the output electrode of the gas tube with alternating current voltage, a frequency selective input circuit for the input electrodes of the gas tube, said input circuit comprising a pair of electron discharge tubes having their space current paths arranged in series, an impedance bridge network having a predetermined frequency rejection characteristic arranged in the output circuit of said one of said pair of tubes, said impedance network being included between the input electrodes of said gas tube, a degenerative feedback circuit connected from said impedance network to the control grid of the second of said series connected tubes, an input signal source for said amplifying stage including signals to be amplified and a controlling signal, means applying said signals to be amplified to said amplifying stage, means applying said controlling signal voltage with said signals to be amplified to the input electrode of said one of said pair of tubes, and said impedance bridge network effecting the application only of said controlling signal voltage between the input electrodes of said gas tube and consequent operation of said amplifying stage for amplifying said signals to be amplified.

9. In an electronic tube signal amplifier, the combination with a signal amplifier stage therein having a cathode return circuit and a signal input grid circuit, of a grid controlled gaseous discharge tube circuit providing connections for the space current path thereof serially in said cathode return circuit, a signal supply circuit connected with said grid circuit, a low pass filter network in said connection effecting the application of signals in said supply circuit to be amplified to said input grid circuit, and a selective tone-responsive amplifying network coupling said gaseous discharge tube circuit with said signal supply circuit effective to apply to said gaseous discharge tube circuit a predetermined control frequency included in said signal supply circuit for firing said tube and energizing said amplifier stage for the transmission of signals therethrough in response to a predetermined tone frequency.

10. In an electronic tube signal amplifier, the combination as defined in claim 9, wherein the coupling means between the gaseous discharge tube circuit and the signal input circuit includes a shunt frequency-responsive bridge-network and an electronic tube amplifying circuit having a feedback connection through said bridge network.

GEORGE D. HANCHETT, Jr.

REFERENCES CITED

The following references are of record in the file of this patent:

UNITED STATES PATENTS

| Number | Name | Date |
|---|---|---|
| 1,396,745 | Haddock | Nov. 15, 1921 |
| 1,804,526 | Coxhead | May 12, 1931 |
| 2,028,859 | Barton | Jan. 28, 1936 |
| 2,038,683 | Schramm | Apr. 28, 1936 |
| 2,135,557 | Beers | Nov. 8, 1938 |
| 2,139,489 | Cockrell | Dec. 6, 1938 |
| 2,151,740 | Burrill | Mar. 28, 1939 |
| 2,265,868 | Schonland | Dec. 9, 1941 |
| 2,368,778 | Purington | Feb. 6, 1945 |
| 2,382,097 | Purington | Aug. 14, 1945 |
| 2,392,672 | Koch | Jan. 8, 1946 |